US006374154B1

(12) United States Patent
Cavens

(10) Patent No.: US 6,374,154 B1
(45) Date of Patent: Apr. 16, 2002

(54) DEVICE FOR MANAGING DISH STOCKS

(75) Inventor: Josephus René Hilda Cavens, Merksplas (BE)

(73) Assignee: Euro-Tap-Control Verkoop, afgekort ETC-V. Naamloze Vennootschap (BE)

( * ) Notice: Subject to any disclaimer, the term of this patent is extended or adjusted under 35 U.S.C. 154(b) by 0 days.

(21) Appl. No.: 09/463,952

(22) PCT Filed: Jun. 8, 1999

(86) PCT No.: PCT/BE99/00072

§ 371 Date: May 17, 2000

§ 102(e) Date: May 17, 2000

(87) PCT Pub. No.: WO99/63871

PCT Pub. Date: Dec. 16, 1999

(30) Foreign Application Priority Data

Jun. 9, 1998 (BE) ............................................ 9800438

(51) Int. Cl.[7] .......................... G06F 17/00; G06F 17/60

(52) U.S. Cl. .......................... 700/231; 700/236; 705/15

(58) Field of Search ................................ 700/236, 218, 700/222, 231, 239; 705/15; 235/380, 381

(56) References Cited

U.S. PATENT DOCUMENTS 4,553,211 A * 11/1985 Kawasaki et al. .......... 700/231
4,629,090 A * 12/1986 Harris et al. ................ 221/7 X
4,791,411 A * 12/1988 Staar ......................... 221/6 X
5,728,999 A * 3/1998 Teicher .................... 235/381 X
5,930,766 A * 7/1999 Gibb ...................... 700/239 X
6,102,162 A * 8/2000 Teicher ...................... 221/2 X

* cited by examiner

*Primary Examiner*—Christopher P. Ellis
*Assistant Examiner*—Gene O. Crawford
(74) *Attorney, Agent, or Firm*—Bacon & Thomas, PLLC

(57) ABSTRACT

Device for managing dish (1) stocks in a restaurant, in particular a fast-service restaurant, characterized in that it contains a storage room (2) with a number of positions for rows of dishes (1), whereby different rows may contain different types of dishes (1), but whereby each row is designed to contain dishes (1) of one and the same type; means (14-17) to move the dishes (1) contained in every row to a distribution point where a dish (1) can be taken out of the storage room (2); means (19) to detect the dishes (1) contained in the storage room (2); at least one instruction means (21) near a preparation room (7); and a computer control (12) where data, among others regarding sales figures, can be put in and/or stored and which is connected to the above-mentioned detection means (19) and the above-mentioned instruction means (21), and which is able to give instructions via the instruction means (21) as a function of the above-mentioned data and of the information of the detection means (19).

14 Claims, 1 Drawing Sheet

DEVICE FOR MANAGING DISH STOCKS

Figures 1, 2:
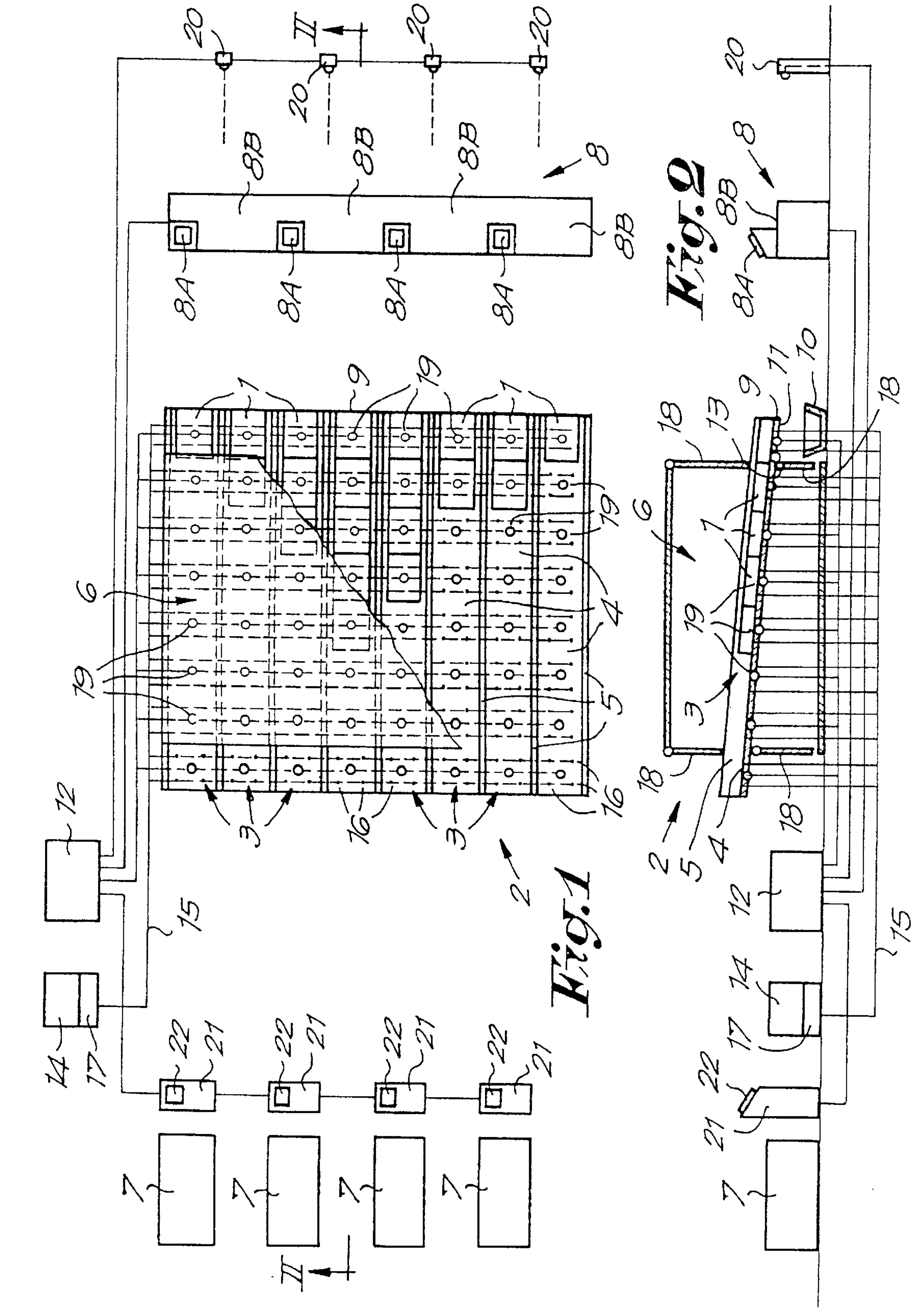

The present invention concerns a device for managing dish stocks in a restaurant, in particular a fast-service restaurant.

These dishes may be composed of several products which are either or not similar, such as vegetables, or they may be composed of one piece, such as a piece of meat, or they may be compound, such as a hamburger sandwich or menu, a sausage roll, a toasted ham and cheese sandwich, a spring roll or such. The dish is hereby preferably packed or at least placed on a plate or saucer or such.

In fast-service restaurants, generally called fast food restaurants, it is customary that dishes such as hamburger menus are lying ready, for example on a table, before the consumer orders them.

However, these dishes may not be left lying too long before use, since their quality quickly deteriorates with time Dishes which are left lying longer than a certain length of time, for example 10 minutes, are often removed and considered as waste.

In order to have a sufficiently large number of dishes of different types in store, so that the consumers do not have to wait, irrespective of the type of dish they have ordered on the one hand, and to lose as few left portions as possible on the other hand, a particularly complicated management is required, the more so since demand may strongly vary in time.

In large fast-service restaurants, this management is entrusted to an employee who, taking into account statistical data regarding the sales in previous periods, decides with what sort of dishes the stocks need to be replenished, and who visually checks what dishes have been lying there for too long and must be removed from the stocks.

This person gives instructions to the persons in the rooms where the food is being prepared to prepare a particular dish in order to anticipate the expected demand for this type of dish. By means of a clock and some sign which accompanies every dish when it is put in store, said person decides what dishes have been lying in store for too long and must be removed.

The stock management not only requires an extra person, but even when this person has a lot of experience and usually has a computer at his disposal containing the actual sales data, his instructions nevertheless remain largely based on speculation and consequently are often wrong, so that a relatively large number of dishes end up as waste, which implies losses.

The invention aims a device for managing dish stocks which avoids these disadvantages and which takes over the task of the above-mentioned person and takes care of the management in a better way.

This aim is reached according to the invention by means of a device containing a storage room with a number of positions for rows of dishes, whereby different rows may contain different types of dishes, but whereby each row is designed to contain dishes of one and the same type; means to move the dishes contained in every row to a distribution point where a dish can be taken out of the storage room; means to detect the dishes contained in the storage room; at least one instruction means near a preparation room; and a computer control where data, among others regarding sales figures, can be put in and/or stored and which is connected to the above-mentioned detection means and the above-mentioned instruction means, and which is able to give instructions via the instruction means as a function of the above-mentioned data and of the information of the detection means.

The troughs may be inclined downwards towards the distribution point, whereby the means for moving the dishes may contain a roller conveyor or means for forming an air cushion. In the latter case, the air cushion may be formed with hot air which is also used to keep the dishes in store warm.

Preferably, the storage room contains a number of troughs whereby every trough contains the positions for one row of dishes.

These troughs may form a whole and together form an inclined surface with walls and partitions.

According to a particular embodiment of the invention, the device also contains a removal mechanism which is controlled by the computer for removing a dish out of a row on the distribution point.

The device may also contain detection. means connected to the computer control for detecting one or several of the following numbers: the number of clients queuing at the cash desk or the ordering desk, the number of clients entering and leaving the restaurant or also the number of passers-by of the restaurant.

In order to better explain the characteristics of the invention, the following preferred embodiment of a device for managing dish stocks according to the invention is described as an example only without being limitative in any way, with reference to the accompanying drawings, in which:

FIG. 1 schematically represents a top view of a device according to the invention, whereby the storage room is represented proportionally larger than the other parts;

FIG. 2 schematically represents a side view of the device from FIG. 1.

The figures represent a device for managing stocks of packed dishes 1, namely hamburger menus, in a fast-service restaurant, namely a hamburger restaurant.

A dish 1 consists of a single hamburger menu packed in a quadrangular box made of foam plastic.

This device contains a storage room 2 with a number of positions for rows of dishes 1 and which consists of a number of inclined troughs 3, for example eight, which are formed of an inclined plane 4 upon which are provided partitions 5 and which is mounted in a tunnel 6. Every trough 3 contains the positions of the dishes of a single row.

The tunnel 6 is shorter than the inclined plane 4, such that this inclined plane 4 protrudes with its top and bottom ends outside the tunnel 6.

Said storage room 2 is erected between a number of preparation rooms 7, for example four, where the meat of the hamburgers is fried and where the hamburger menus are composed on the one hand, and of a number of cash desks 8, for example also four, where one must order and which, apart from a cash register 8A, also contain a delivery counter 8B.

The highest end of the troughs 3 is situated on the side of the preparation rooms 7. At this end, the position for one dish 1 is situated outside the tunnel 6. The lowest end is situated on the side of the cash desks 8. At this end, the position for one dish 1 is also situated outside the tunnel 6. This end of the trough 3 is closed off by a wall 9 and the above-mentioned position on this end forms the point of distribution where the dishes 1 can be taken out of the trough 3.

Against this wall 9 and above a discharge chute 10 for waste is provided an opening in the bottom of every trough 3 which is large enough for a packed dish 1 and which can be closed off by means of a removal mechanism 11,13 which can be controlled from a distance by a computer control 12.

In the given example, this removal mechanism 11,13 consists of a flap 11 which can be rotated by a motor 13 controlled by the computer control 12. However, this removal mechanism 11 may also be a conveyor belt or such whose driving motor is controlled by the computer control 12.

The device contains a transport device for moving the packed dishes 1 in every trough 3 to the above-mentioned point of distribution at the lower end of this trough.

The slope of the troughs 3 is not sufficient as such for the packed dishes 1 to automatically carry out said movement due to the force of gravity and to link up in a single row.

That is why the transport device also includes a roller conveyor in the bottom of the troughs 3 or the transport device 14-17 may provide for an air cushion under the packed dishes 1.

The transport device 14-17 includes a compressor 14 for sending air to openings 16 provided in the bottom of the troughs 3 via air pipes 15. These pipes 15 may be connected directly to the openings 16, as represented in the figures, or they may open into the tunnel 6 under the inclined plane 4.

In this case, the tunnel 6 is preferably closed on both ends under the inclined plane 4.

The transport device 14-17 preferably also includes a heat exchanger or heating unit 17 on the outlet of the compressor 14 to heat the air, such that the air for the air cushion can also be used for keeping the dishes 1 warm.

Among other things to restrict the heat loss, the tunnel 6 is closed off by walls 18 on both ends, at least above the inclined plane 4, but preferably also under said inclined plane 4, save for a passage for the dishes 1.

These walls 18 are preferably translucent, for example made of Plexiglas. In view of possible maintenance works or reparations, these walls 18 are removable or hinge-mounted in relation to the tunnel 6.

The device further includes a detection device 19 connected to the computer control 12 for detecting the dishes 1 which are situated in every trough 3. In the embodiment represented, the detection device 19 includes a single sensor on every place where there may be a packed dish 1, and thus they cannot only detect how many dishes 1 are situated in the trough 3, but they can even detect on what place the dishes 1 are situated in the trough 3. These sensors are for example infrared detectors which have been worked into the bottom of the troughs 3. The detectors may also be proximity switches, photo detectors, light-sensitive resistors, camera's connected to a PC or such, and they may also be erected above or next to every place or possible place of a dish 1.

In the given example, a maximum of eight packed dishes 1 may be situated in the trough 3 so that, as there are eight troughs 3, the detection device 19 includes sixty four detectors which are each connected separately to the computer control 12.

The computer control 12 is also connected to the detection device 19 for detecting how many people are queuing at the cash desks 8. Also the detection device may consist of one or several infrared or other detectors. These detectors determine the presence or absence of people in line.

Also means which detect the number of people entering and/or leaving the restaurant may be connected to the computer control 12, and even means detecting the number of passers-by in the street.

This computer control 12 is equipped with a clock, a calendar and a memory in which the information of the above-mentioned detection means and thus among others of the transport device 14-17 and detection device 19 and of the cash desks 8 can be stored together with the data of previous sales.

Finally, the device contains an instruction device 21 near each of the preparation rooms 7 which is connected to the computer control 12 and contains an audio-visual means, for example a screen 22 and/or an audio signal generator and/or an optical signal generator.

The working of the device is simple and as follows:

The activity on the cash desks 8 is detected by the means 20 and possibly also the number of passers-by.

These data are put in the computer control 12, together with the data regarding the orders of the cash desks 8, which also reckons with data contained in its memory or which are read from a data carrier regarding the sales at the same point of time in the past, for example a preceding year, a preceding month or even a preceding day.

As a function thereof, the computer control 12 will calculate how many of each sort of dishes should be in store or, in other words, how many dishes should be found in every trough 3.

The computer control 12 receives data from the detectors forming the detection device 19 about the number of dishes 1 which are actually present in the trough 3.

If the required number of dishes 1 in a trough 3 does not coincide with the number of detected dishes 1 in this trough 3, the computer control 12 will give instructions via one of the instruction means 21, namely via the one situated near the preparation room 7 where the dishes 1 for this trough 3 are prepared, to prepare one or several of these dishes 1 and to place it/them in the trough 3.

The computer control 12 may hereby take into account that when the restaurant opens, a minimum of dishes must be placed in every trough 3. In order to determine this minimum, the computer control 12 may base itself on statistical data available in its memory and/or which can be read from a data carrier such as a diskette.

Every time a dish 1 is placed in a trough 3, this is detected by one of the detectors of the detection device 19, and the computer control 12 will note the point of time at which this takes place. Via the detection device 19, the computer control 12 can follow the progress of this dish in a trough 3, and it knows at any time where the dish is situated and how long it has already been in the trough 3.

Each time the oldest dish 1 in a trough 3, which naturally is situated against the wall 9 and thus above the flap 11 at the lowest end of a trough 3, has been longer in the trough 3 than a predetermined length of time, the computer control 12 will command, by means of the motor 13, the removal mechanism 11,13 to become activated, for example by opening a flap in the bottom of the trough 3, so that said oldest dish 1 falls in the discharge chute 10.

Naturally, when determining the number of dishes 1 that are actually present in every trough 3, the computer control 12 will reckon with the removed dishes 1, both the dishes which have been removed by the removal mechanism 11,13 and those which have been taken out of the trough by an employee, for example a cashier, for delivery to a client at the delivery counter 8B.

Each time a single dish 1 disappears in any of the above-mentioned ways, the other dishes 1 in the trough 3 will automatically link up to one another thanks to the transport device 14-17 producing an air cushion, so that as row is formed which constantly links up to the bottom end of the trough 3. The transport device 14-17 may only produce an air cushion when the movement of one or several dishes 1 becomes necessary, but preferably it continuously produces an air cushion.

The computer control 12 can thus order the preparation of different types of new dishes 1 in a quicker way and with more precision, as a function of the expected sales of every dish 1 of the type in question.

The losses resulting from dishes 1 which have been lying in the storage room 2 for too long is restricted to a minimum.

The computer control can continuously evaluate the situation and make quick adjustments if necessary.

The present invention is by no means limited to the above-described embodiments represented in the accompanying drawings; on the contrary, such a device for managing dish stocks can be made in all sorts of variants while still remaining within the scope of the invention.

In particular, the transport device 14-17 for moving the dishes must not necessarily contain a roller conveyor or an air cushion.

It may possibly consist of the mere inclined plane 4, provided its gradient is large enough, whereby the surface of this plane 4 is preferably smooth.

The transport device 14-17 may also include driven means and for example contain a conveyor belt forming the bottom of the troughs.

When they are driven, these means can be controlled by the computer control. If the means are driven, the troughs must not necessarily be inclined. Neither should the dishes 1 link up to one another in a single row, but the row must be a continuous row and not contain any gaps where there could be a dish.

What is claimed is:

1. A device for managing dish stocks in a restaurant and positioned between at least one food preparation room and to at least one cash desk, said device comprising:

a storage room having a number of positions for rows of dishes extending across said storage room from one side to adjacent said at least one food preparation room and another side adjacent to said at least one cash desk, each row configured and dimensioned to accommodate different types of dishes wherein each row is arranged to contain dishes of a predetermined type;

a transport device arranged to transport dishes positioned in each of said rows to a distribution point, said distribution point being positioned near the periphery of said another side of said storage room;

a detection device including detectors arranged along each of said rows to detect dishes in each of said rows;

at least one instruction device separately located outside the periphery of said one side of said storage room said at least one food preparation room, said at least one instruction device indicating which among said different types of dishes are to be prepared; and a computer control device linked to said detection device and said at least one instruction device, wherein said computer control device is arranged to receive data regarding sales figures of said predetermined types of dishes, said computer control device sending food preparation instructions to said instruction device as a function of said sales figures and detected data from said detection device.

2. The device according to claim 1 further comprising a removal mechanism controlled by said computer control device, said removal mechanism arranged to remove a dish located in one of said rows of said storage room positioned at the distribution point.

3. The device according to claim 1 wherein one instruction device is provided for and located near each of said food preparation rooms.

4. The device according to claim 1 wherein each instruction device includes an audio-visual display.

5. The device according to claim 1 wherein the detection device includes a single detector corresponding to each position a dish may be positioned in said storage room.

6. The device according to claim 1 wherein said detection device is arranged to send information to said computer control device, said information including the number of clients in line at a corresponding cash desk, the number of clients entering and leaving said restaurant and the number of passers-by of the restaurant.

7. The device according to claim 1 wherein the storage room comprises a plurality of troughs, each of said troughs forming a single one of each of said rows.

8. The device according to claim 7 wherein each of said troughs includes a downward incline beginning at said one side of said storage room and descending towards said distribution point, said transport device including a roller conveyor.

9. The device according to claim 7 wherein each of said troughs includes walls and partitions dimensioned and configured to retain said dishes.

10. The device according to claim 7 wherein each of said troughs includes a downward incline beginning at said one side adjacent to said at least one food preparation room and descending towards said distribution point, said transport device arranged to form an air cushion under said dishes.

11. The device according to claim 10 wherein the transport device includes a heating unit arranged to heat the air generated by said air cushion.

12. The device according to claim 7 wherein said storage room includes a tunnel formed by a top, a bottom and side walls forming the periphery of said storage room.

13. The device according to claim 12 wherein portions of said plurality of troughs extend beyond the periphery of said storage unit adjacent to said at least one food preparation room and said at least one cash desk.

14. The device according to claim 13 wherein said side walls of said tunnel adjacent to said at least one food preparation room and said at least one cash desk are hinged to a stationary portion of said tunnel.

* * * * *